Patented Dec. 2, 1947

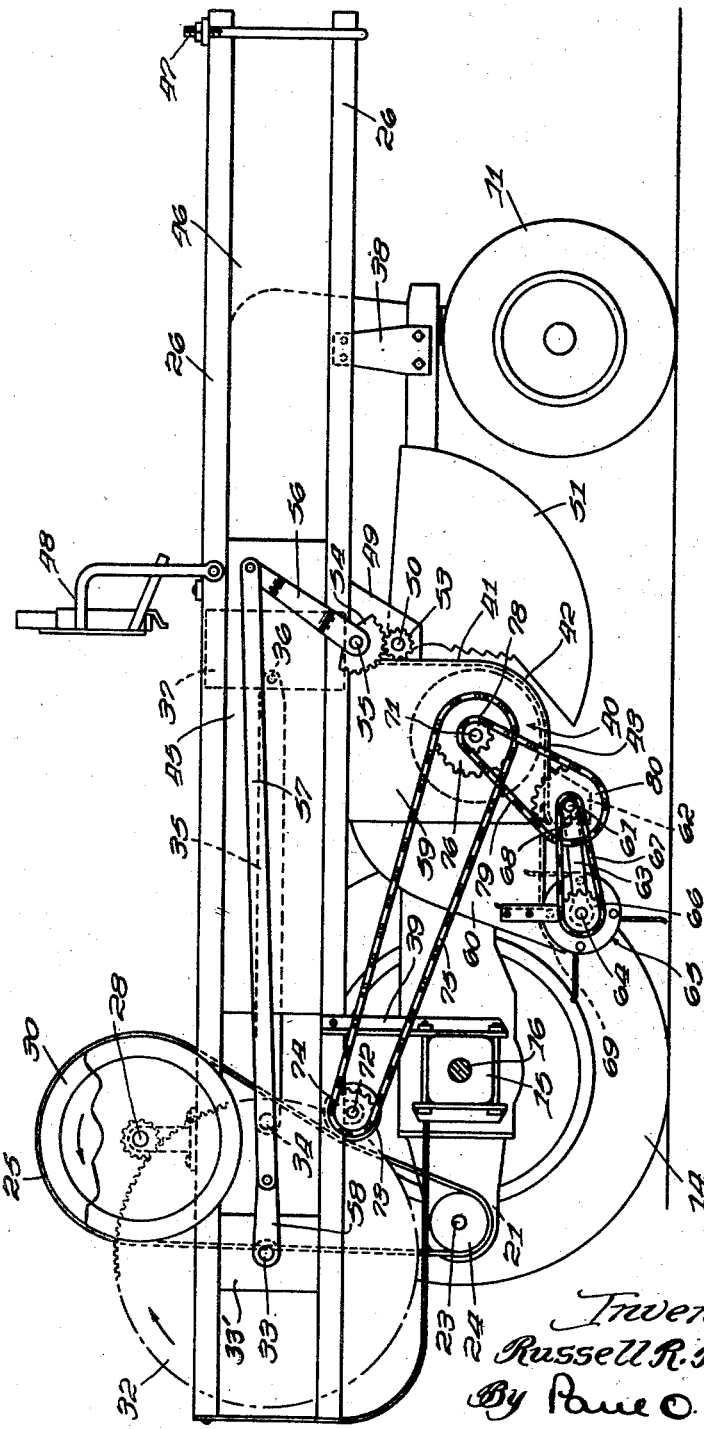

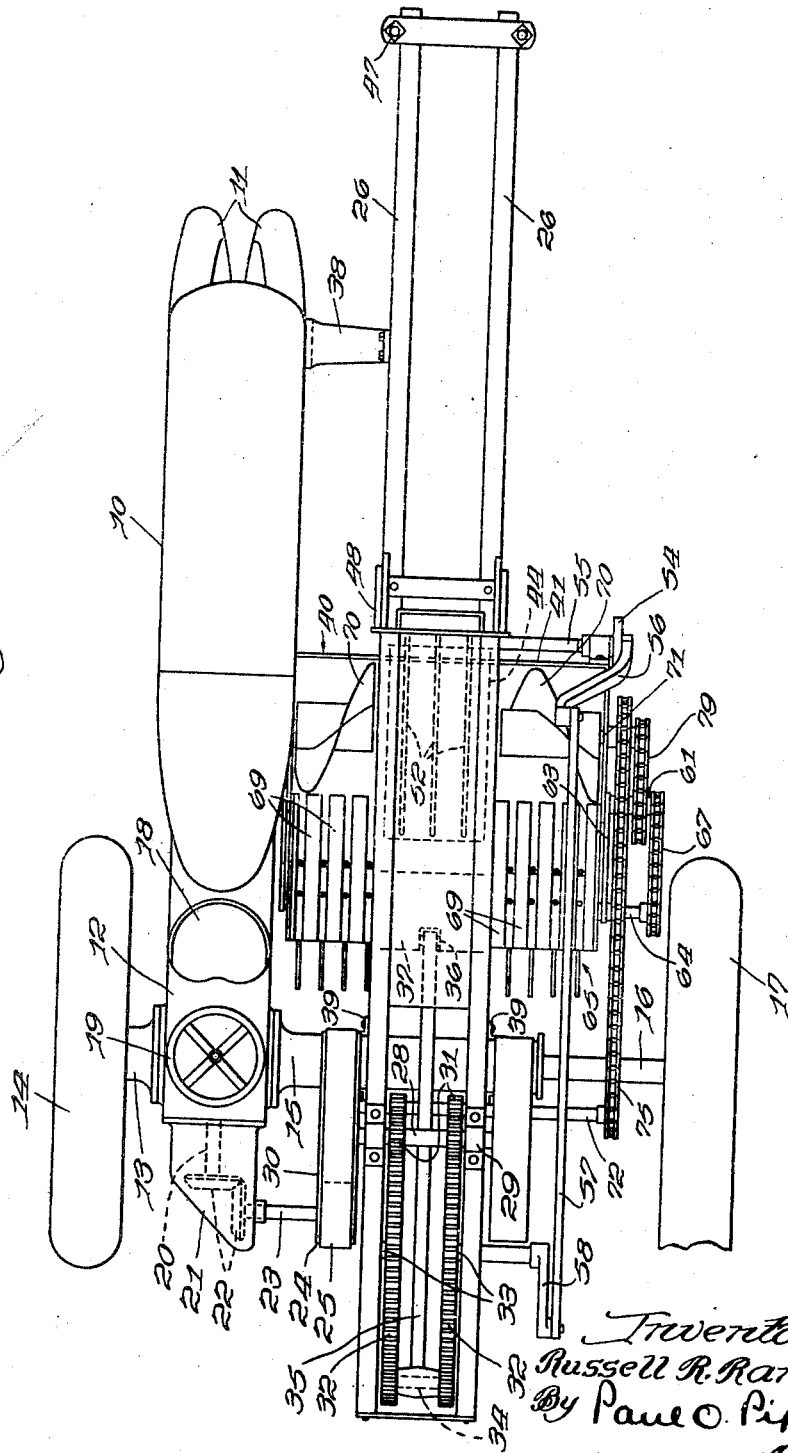

2,431,828

UNITED STATES PATENT OFFICE 2,431,828

TRACTOR-MOUNTED PICKUP BALER

Russell R. Raney, La Grange, Ill., assignor to International Harvester Company, a corporation of New Jersey Application August 21, 1944, Serial No. 550,414

16 Claims. (Cl. 100—19)

This invention relates to a pick-up baler. More specifically, it relates to a baler particularly adapted to be mounted on a tractor.

The trend of recent years has been to mount implements directly on tractors. Such constructions eliminate or simplify the supporting structure for the implement and reduce the material and equivalent necessary to construct a satisfactory implement. The supporting of an implement directly on to the tractor also greatly improves the maneuverability of the implement which is very advantageous when crops are to be operated upon.

The principal object of the invention is to provide an improved self-propelled baling mechanism.

A more specific object is to provide a pick-up baler particularly adapted for mounting on a tractor of a conventional design.

Another object is to provide a tractor mounted baler structure in which the traction wheels of a tricycle type of tractor are operated at the forward end in the direction of operation, a pick-up device being provided beneath the drive axle structure of the tractor.

Another object is the provision of an undershot pick-up baler with means for feeding material endwise from a feed table and vertically upwardly into a bale chamber.

The above objects and others, which will be apparent from the detail description to follow, are attained by a construction such as illustrated in the drawings, in which:

Fig. 1 is an elevation of a tractor with a pick-up baler mounted thereon, one wheel being removed to better show the relationship of the baler to the tractor; and Fig. 2 is a plan view of the structure shown in Fig. 1.

The drawings are somewhat diagrammatic in only the outlines of the tractor structure and certain other of the elements of the device are shown. As the invention resides in the relation of the baler with respect to the tractor and in the relation of the functional elements of the baler with respect to each other, the driving mechanism and other details of the construction have been indicated only diagrammatically in so far as some of the construction is concerned.

The tractor illustrated is of a conventional tricycle type which has been converted to an offset tricycle type of tractor. A narrow body 10, is shown, at the front of which there is a steerable front truck including wheels 11. The body 10 has a relatively narrow housing 12 extending rearwardly which contains a portion of the drive mechanism for the tractor. A relatively short housing 13 is shown at one side of the housing 12, said housing containing axle structure for driving a traction wheel 14. At the other side of the housing 12, a relatively long housing 15 is illustrated, said housing forming a supporting structure for a drive axle 16 on which a traction wheel 17 is mounted. An operator's station 18 and a steering means 19 are also illustrated in Fig. 2. Other necessary controls are provided within reach of the operator.

A power take-off shaft 20, extending from the housing 12, projects into a housing 21 secured to the housing 12. Housing 21 contains a pair of bevel gears 22 by means of which power is transmitted to a transversely extending shaft 23. Said shaft carries a pulley 24 which engages a drive belt 25 for operating the baling mechanism as will be hereinafter described.

Although the tractor illustrated has a long housing at one side and a short housing at the other side, a construction may be utilized with long live axle wheel housings of substantially the same length and dished wheels which may be reversed to give space between the outer wheel and the tractor body for the positioning of an implement such as the baler illustrated.

The baler structure, in so far as the drive, feeding chamber and baling chamber are concerned, is of a conventional construction. Four angle frame members 26 extending beyond the tractor in each direction form the basic frame for the baler. At one end beyond the traction wheels of the tractor, a transverse shaft 28 is mounted in brackets 29 on the two upper frame members 26. Said shaft carries a combined fly-wheel and drive pulley 30 at the side of the baler frame structure adjacent the tractor. The belt 25, previously referred to, drives the pulley 30 and the shaft 28. A pair of spaced gears 31 on the shaft 28 mesh with and drive a pair of gears 32 rotatably mounted on shafts 33, suitably supported on vertical bracket members 33' secured respectively at the sides of the baler frame structure. A crank pin 34, connecting the gears 32, provides a journal for a connecting rod or plunger operating member 35, which is journaled at one end on the shaft 34 and is pivotally connected at its other end at 36 to a plunger 37, which reciprocates inside the frame structure in a portion thereof, which can be termed both as the plunger chamber and the material receiving chamber for material to be baled.

The frame structure of the baler which carries all of the operating mechanism is rigidly secured on the tractor by detachable brackets, whereby the baler structure may be readily removed from the tractor. At the front end of the tractor, a bracket 38 is shown, said bracket being secured to one of the angle frame members 26 of the baler frame structure and to the side of the tractor body 10. At the rear of the tractor, two vertical brackets 39 are illustrated as being connected to the lower angle frame members 26 and to the extended axle housing 15. By removing the connection of the brackets 38 and 39 with the tractor, the baler may be removed as a unit from the tractor.

A housing designated in its entirety by the reference character 40 is secured to the frame structure of the baler extending downwardly therefrom. Said housing has a transverse vertical back wall 41, a curved wall 42 adjoining the back wall and extending forwardly terminating in a flat wall 43, which constitutes the feed table for receiving the material which is picked up and which is subsequently fed to the baling chamber. The dotted line 44 in Fig. 2 represents an opening in the bottom of the bale frame structure through which material is fed into the plunger chamber for compression into the bale chamber. The central portion of the bale chamber, in which the plunger reciprocates, is designated by the reference character 45 as the plunger chamber and the material receiving chamber. The open end portion of the baler frame structure, through which the material to be baled is compressed, is designated by the reference character 46 and termed as the bale chamber. Said bale chamber may be of any conventional construction and may be closed on the bottom and top with plates and open at the sides for threading baling ties as the bales are being formed. A means 47 is illustrated for regulating the restriction of the bale chamber and thereby the compression on the bale. A block setting device 48 is also illustrated as being mounted above the bale chamber and adjacent the material receiving chamber 45. Any manual or automatic type of block setting device may be utilized, or the bales may be formed and tied without the use of blocks.

On a pair of brackets 49, depending from the lower frame members 26, a transverse shaft 50 is journaled for oscillation. A plurality of feeder elements 51 are secured for oscillation with the shaft 50, said members being adapted to pass through correspondingly spaced slits 52 in the bottom of the feed housing 40 for lifting material therefrom and moving it upwardly through the opening 44 into the material receiving chamber and into the path of the plunger 37. The feed members 51 may be driven in timed relation with respect to the plunger by a mechanism, such as illustrated, in which a gear 53 on the shaft 50 meshes with a gear segment 54 on a shaft 55, pivotally mounted on a transverse axis on the brackets 49. An arm 56 rigidly secured to the shaft 50 is connected to a reciprocable link 57. Said link at its other end is pivoted to a crank arm 58 rigidly secured to an extension of one of the shafts 33, as best shown in Fig. 2.

The housing 40, in addition to the vertical wall 41 and the horizontal wall 43 which provides a feed table, includes end walls 59. Said walls are provided with extensions 60 which form a throat for directing material picked up into the housing 40 and onto the feed table 43.

A transverse shaft 61 mounted on downward extension 62 projecting from the housing 40 forms a pivot axis for supporting arms 63. Said arms extend substantially horizontally and form a floating support for a shaft 64 on which a resilient finger type pick-up device 65 is mounted. Said device is driven in a direction to pick up material and move it upwardly and rearwardly with respect to direction of movement of the machine by a sprocket 66 mounted on the shaft 64, a chain 67, and a sprocket 68 mounted on the shaft 61. The spring fingers of the pick-up device pass between spaced sheet metal extensions 69 which are secured to the feed table 43 extending in a downwardly curved relation over the drum portion of the pick-up device 65. The side shields or plates 60 may be carried with the pick-up device and in that case are slidable with respect to the end plates 59 of the housing 40.

The material delivered to the center of the feed table 43 is in a position to be engaged by the feed members 51. The material delivered to the ends of said feed table is engaged by a pair of open end spiral auger devices 70. Said devices are supported on shafts 71 carried by the end walls 59 of the housing 40. The flights on the augers are in opposite directions so that, when being driven in the same direction, they both feed toward the center, whereby the material will be in a position to be moved upwardly by the feed members 51.

A drive mechanism for the outside auger is illustrated, said drive mechanism also providing a drive for the pick-up device. A transverse shaft 72 mounted on the frame structure beneath the lower frame members 26 carries a pulley 73 which is engaged by the main drive belt 25. A sprocket 74 on the shaft 73 drives a chain 75 which engages a sprocket 76 mounted on one of the auger shafts 71. By this means, the auger is driven and by means of a sprocket 78, also mounted on the auger shaft, and a chain 79, a drive is transmitted to a sprocket 80 mounted on the shaft 61. The auger at the other side is preferably driven by a chain identical with a chain 79 at the other side of the pick-up mechanism.

In the operation of a tractor mounted pick-up baler, as described, the operator steers a machine so that the pick-up device 65 passes down a windrow of cured hay or other material to be baled. The material is moved upwardly and over along the member 69 onto the feed table 43. The augers move the material, at the ends of the pick-up device, to the center into the path of the members 51. As previously explained, the members 51 are driven in timed relation with respect to the plunger 37, whereby upon the withdrawal of said plunger an additional charge of the material is fed through the opening 44 into the material receiving chamber 45. The baler continues to function in this manner, blocks being inserted or ties being made by a conventional method.

With the construction of this invention, a self-propelled baler is provided which gives the operator good vision of the terrain being traversed, enabling him to keep the pick-up device in the optimum position with respect to the windrow. Having a uniform type of self-propelled machine, the tractor mounted baler may be maneuvered in a small amount of space and around short turns and corners of any type. Also, a machine may be readily operated in reverse direction for further ease of maneuverability.

Another outstanding advantage of the construction of the invention is that such a baler may be applied to a substantially standard tractor by providing modified controls for operating in a reverse direction. The baler may also be readily removed for the mounting of other machines, such as harvesting threshers and corn harvesting machines.

It is to be understood that applicant has shown and described only a preferred embodiment of his invention and any such details of construction and driving mechanisms as are necessary to properly define the functional and structural relationship of the component parts. All modifications are contemplated as a part of the invention which fall within the scope of the appended claims.

What is claimed is:

1. A baler attachment for a tractor having a longitudinal body and a wide axle structure at one side of one end thereof comprising, a frame structure extending alongside the tractor body, a plunger driving mechanism mounted on said frame structure adjacent the axle structure whereby the weight of said mechanism is carried thereby, a bale chamber on the frame structure alongside the tractor body and a pick-up and feeding device below the frame structure intermediate the bale chamber and the plunger mechanism.

2. A baler attachment for a tricycle tractor having a longitudinal body, a wide axle structure and traction wheels at the front in the direction of movement during operation with the baler attachment comprising, a frame structure extending alongside the tractor body, a plunger driving mechanism mounted on said frame structure adjacent the axle structure whereby the weight of said mechanism is carried thereby, a bale chamber on the frame structure rearwardly of the axle structure and a pick-up and feeding device below the frame structure intermediate the bale chamber and the plunger mechanism.

3. A baler attachment for a tractor having a longitudinal body and a wide axle structure at the end of the tractor which is at the front during operation with the baler attachment comprising a frame structure extending alongside the tractor body, a plunger driving mechanism mounted on said frame structure adjacent the axle structure whereby the weight of said mechanism is carried thereby, a bale chamber on the frame structure rearwardly of the axle structure and a pick-up and feeding device below the frame structure intermediate the bale chamber and the plunger mechanism.

4. A baler attachment for a tricycle tractor having a longitudinal body and a wide axle structure at one side thereof comprising a frame structure extending alongside the tractor body and over the axle structure thereof, a plunger driving mechanism mounted on said frame structure, a bale chamber on the frame structure and a pick-up and feeding device underneath the frame structure intermediate the bale chamber and the plunger mechanism, said device including a material pick-up device operating adjacent the ground, said bale chamber having a bottom opening and a feed mechanism for moving the material upwardly into the bale chamber through said opening.

5. A baler attachment for a tricycle tractor having a longitudinal body and a wide axle structure at one side thereof comprising a frame structure extending alongside the tractor body and over the axle structure thereof, a plunger driving mechanism mounted on said frame structure, a bale chamber on the frame structure and a pick-up and feeding device below the frame structure intermediate the bale chamber and the plunger mechanism, said device including material pick-up means operating adjacent the ground, and a feed mechanism for moving the material upwardly into the bale chamber.

6. A baler attachment for a tractor having a longitudinal body and a wide axle structure at one side thereof, said axle structure being at the front when the tractor is operated with the baler attachment comprising a frame structure extending alongside the tractor body and over the axle structure thereof, a plunger driving mechanism mounted on said frame structure, a bale chamber on the frame structure and a pick-up and feeding device below the frame structure intermediate the bale chamber and the plunger mechanism, said device including material pick-up means operating adjacent the ground, and a feed mechanism for moving the material upwardly into the bale chamber.

7. A self-propelled baler comprising a motor propelled frame having a longitudinal body including a power plant, a wide axle and traction wheels on the axle, a frame structure extending alongside the body, a plunger driving mechanism mounted on said frame structure adjacent the axle whereby the weight of said mechanism is carried thereby, a bale chamber on the frame structure alongside the body, and a pick-up and feeding device located intermediate the bale chamber and the plunger mechanism and laterally between the traction wheels.

8. A self-propelled baler comprising a motor propelled frame having a longitudinal body including a power plant, a wide axle at the front in the direction of movement during operation and traction wheels on the axle, an operator's station over said axle, a frame structure extending alongside the body, a plunger driving mechanism mounted on said frame structure adjacent the axle whereby the weight of said mechanism is carried thereby, a bale chamber on the frame structure alongside the body, and a pick-up and feeding device intermediate the bale chamber and the plunger mechanism.

9. A self-propelled baler comprising a motor propelled frame having an offset longitudinal body including a power plant, a wide axle and traction wheels on the axle, an operator's station over said axle in alignment with the body frame structure extending alongside the body, a plunger driving mechanism mounted on said frame structure adjacent the axle whereby the weight of said mechanism is carried thereby, a bale chamber on the frame structure alongside the body, and a pick-up and feeding device intermediate the bale chamber and the plunger mechanism.

10. A tractor mounted and operated baler for a tractor adapted to operate in the direction of the traction wheels, said tractor having a longitudinal body, a wide axle structure and traction wheels at one end of the body and a narrow rolling support at the other end thereof and in combination therewith a frame structure extending alongside the tractor body forwardly thereof and over the axle structure thereof, a plunger driving mechanism mounted on said frame structure adjacent the axle structure whereby the weight of said mechanism is carried thereby, a bale chamber on the frame structure rearwardly of the axle structure and a pick-up and feeding device below the frame structure intermediate the bale chamber and the plunger mechanism.

11. A tractor mounted and operated baler for a tractor adapted to operate in the direction of the traction wheels, said tractor having a longitudinal body, a wide axle structure and traction wheels at one end of the body and a narrow rolling support at the other end thereof and in combination therewith a frame structure extending alongside the tractor body forwardly thereof and over the axle structure thereof, a plunger driving mechanism mounted on said frame structure adjacent the axle structure whereby the weight of said mechanism is carried thereby, a bale chamber on the frame structure rearwardly of the axle structure and a pick-up and feeding device below the frame structure intermediate the bale chamber and the plunger mechanism, said device including a material pick-up device operating closely adjacent the ground, a feed table on which the material is delivered, conveying means for moving the material from the outside ends of the feed table to the center thereof, and a feed mechanism for moving the material upwardly into the bale chamber.

12. A baler attachment for a tricycle tractor adapted to operate in the direction of the traction wheels having a longitudinal body, an axle structure at the front end of the body in the direction of travel during normal operation and a narrow steerable rolling support at the rear end of the body comprising a frame structure extending alongside one side the tractor body forwardly over the rear axle structure, a plunger driving mechanism mounted on said frame structure adjacent the axle structure whereby the weight of said mechanism is carried thereby, a bale chamber on the frame structure forwardly of the axle structure and a pick-up and feeding device below the frame structure intermediate the bale chamber and the plunger mechanism.

13. A baler attachment for a tricycle tractor adapted to operate in the direction of the traction wheels having a longitudinal body, an axle structure at the front end of the body in the direction of travel during normal operation and a narrow steerable rolling support at the rear end of the body comprising a frame structure extending alongside one side the tractor body forwardly over the rear axle structure, a plunger driving mechanism mounted on said frame structure adjacent the axle structure whereby the weight of said mechanism is carried thereby, a bale chamber on the frame structure forwardly of the axle structure and a pick-up and feeding device below the frame structure intermediate the bale chamber and the plunger mechanism, said device including a material pick-up device operating closely adjacent the ground, a feed table on which the material is delivered, conveying means for moving the material from the outside ends of the feed table to the center thereof, and a feed mechanism for moving the material upwardly into the bale chamber.

14. A baler attachment for a tricycle tractor having a wheeled wide tread front axle structure, a narrow body extending rearwardly offset with respect to the center line of said axle structure, a narrow rolling support at the rear of said body and an operator's station at the front offset in the same direction as the body comprising a frame structure extending alongside the tractor body and over the axle structure thereof, a plunger driving mechanism mounted on said frame structure adjacent the axle structure whereby the weight of said mechanism is carried thereby, a bale chamber on the frame structure rearwardly of the axle structure and a pick-up and feeding device intermediate the bale chamber and the plunger mechanism.

15. A baler attachment for a tricycle tractor having a wheeled wide tread front axle structure, a narrow body extending rearwardly offset with respect to the center line of said axle structure, a narrow rolling support at the rear of said body and an operator's station at the front offset in the same direction as the body comprising a frame structure extending alongside the tractor body and over the axle structure thereof, a plunger driving mechanism mounted on said frame structure adjacent the axle structure whereby the weight of said mechanism is carried thereby, a bale chamber on the frame structure rearwardly of the axle structure and a pick-up and feeding device below the frame structure intermediate the bale chamber and the plunger mechanism, said device including a material pick-up device operating closely adjacent the ground, a feed table on which the material is delivered, conveying means for moving the material from the outside ends of the feed table to the center thereof, and a feed mechanism for moving the material upwardly into the bale chamber.

16. A traveling baler comprising a wheel supported frame structure, a plunger driving mechanism mounted on said frame structure, a bale chamber on the frame structure and a pick-up and feeding device underneath the frame structure intermediate the bale chamber and the plunger mechanism, said device including a material pick-up device operating adjacent the ground, said bale chamber having a bottom opening and a feed mechanism for moving the material upwardly into the bale chamber through said opening.

RUSSELL R. RANEY.

REFERENCES CITED

The following references are of record in the file of this patent:

UNITED STATES PATENTS

| Number | Name | Date |
| --- | --- | --- |
| 1,755,524 | Stanfield | Apr. 22, 1930 |
| 2,259,892 | Hyman | Oct. 21, 1941 |
| 2,294,440 | Barker | Sept. 1, 1942 |